(12) United States Patent
Elliott (10) Patent No.: US 7,414,415 B2
(45) Date of Patent: Aug. 19, 2008

(54) SENSORS

(75) Inventor: Howard Elliott, Kineton (GB)

(73) Assignee: Future Technology (Sensors) Limited (GB)

( * ) Notice: Subject to any disclaimer, the term of this patent is extended or adjusted under 35 U.S.C. 154(b) by 0 days.

(21) Appl. No.: 10/573,695

(22) PCT Filed: Jul. 12, 2004

(86) PCT No.: PCT/GB2004/003020

§ 371 (c)(1),
(2), (4) Date: Jun. 27, 2006

(87) PCT Pub. No.: WO2005/031250

PCT Pub. Date: Apr. 7, 2005

(65) Prior Publication Data

US 2007/0108050 A1    May 17, 2007

(30) Foreign Application Priority Data

Sep. 27, 2003 (GB) ................... 0322655.2

(51) Int. Cl.
*G01R 27/26* (2006.01)
(52) U.S. Cl. ..................... 324/690; 324/662
(58) Field of Classification Search ............. 324/690, 324/662

See application file for complete search history.

(56) References Cited

U.S. PATENT DOCUMENTS

| | | | |
|---|---|---|---|
| 3,921,805 A | 11/1975 | Compere | |
| 4,128,776 A | 12/1978 | Boquist et al. | |
| 4,294,361 A | 10/1981 | Margulies et al. | |
| 4,604,905 A | 8/1986 | Rademacher-Dubbick | |
| 5,101,165 A * | 3/1992 | Rickards | 324/662 |
| 5,247,837 A | 9/1993 | Corpron | |
| 5,270,664 A * | 12/1993 | McMurtry et al. | 324/690 |
| 5,760,593 A | 6/1998 | Lawrence et al. | |
| 5,944,191 A | 8/1999 | Ray et al. | |
| 5,973,502 A * | 10/1999 | Bailleul et al. | 324/690 |
| 6,171,460 B1 | 1/2001 | Bill | |
| 6,374,680 B1 * | 4/2002 | Drewes et al. | 73/718 |
| 6,465,271 B1 * | 10/2002 | Ko et al. | 438/48 |

FOREIGN PATENT DOCUMENTS

| | | |
|---|---|---|
| EP | 0551525 | 7/1993 |
| GB | 3002309 | 4/2002 |
| GB | 3002310 | 4/2002 |
| GB | 3002243 | 3/2003 |

* cited by examiner

*Primary Examiner*—Vincent Q Nguyen
(74) *Attorney, Agent, or Firm*—Peter S. Gilster; Greensfelder, Hemker & Gale, P.C.

(57) ABSTRACT

A sensor (1) for capacitively measuring the distance to a stationary or passing object. The sensor has an electrode (2) that capacitively couples with the object and is formed from an electrically conductive ceramic material. The electrode is substantially surrounded by a housing (4) formed from an electrically non-conductive ceramic. The electrically conductive and electrically non-conductive ceramic materials are chosen to that they have the similar thermal expansion coefficients so that the sensor remains virtually stress free at high temperatures.

13 Claims, 9 Drawing Sheets

SENSORS

CROSS-REFERENCE TO RELATED APPLICATION

This application is a United States national stage of PCT International Application No. PCT/GB2004/003020, with international filing date of Jul. 12, 2004, published Apr. 7, 2005 as WO 2005/031250, and is based upon and claims the benefit of priority of said PCT application, the entirety of which is incorporated herein by reference.

TECHNICAL FIELD

The present invention relates to sensors, and in particular to sensors that can be used for capacitively measuring the distance to either a stationary or passing object.

BACKGROUND ART

In many industrial measurement applications there is a need for a sensor that can be used at high operating temperatures to measure the distance to either a stationary or passing object. A typical application is the measurement of clearance between the tip of a gas turbine engine blade and the surrounding casing. In this situation the operating temperature of the sensor can reach 1500° C. Other applications including molten metal and molten glass level measurement, for example, have similar operating temperature requirements.

U.S. Pat. No. 5,760,593 (BICC plc) describes a conventional sensor having a metal or metal-coated ceramic electrode that couples capacitively with the stationary or passing object. The electrode is connected directly to the centre conductor of a standard triaxial transmission cable and is surrounded by a metal shield and an outer housing. The metal shield and the outer housing are connected directly to the intermediate conductor and the outer conductor of the triaxial transmission cable respectively. Electrical insulation is provided between the electrode and the shield and also between the shield and the housing. The insulation can be in the form of machined ceramic spacers or deposited ceramic layers.

One problem with these conventional sensors is that they utilise an alternating combination of metal and ceramic materials. As the operating temperature of the sensor increases, the metal components tend to expand more than the ceramic components. This often results in stress fractures forming in the ceramic spacers or layers, which reduce their electrical performance and may even result in the disintegration or de-lamination of the ceramic components. Not only does this cause the sensor to fail electrically, but the disintegration or de-lamination of the ceramic components also allows the metal components to vibrate and this can result in the mechanical failure of the complete sensor assembly.

Gas turbine engine manufacturers now require an operating lifetime of at least 20,000 hours for sensors that are to be fitted to production models. Although conventional sensors have been successfully used at high operating temperatures for short periods of time, it is unlikely that they will ever be able to meet the required operating lifetime because of the inherent weakness of the sensor assembly caused by the different thermal expansion properties of the metal and ceramic components.

A further problem is the way in which the electrode, shield and outer housing are connected to the transmission cable. With conventional sensor designs, the conductors of the transmission cable are directly connected to the electrode, shield and outer housing at a high temperature region (i.e. a part of the sensor that reaches an elevated temperature in use). Many types of transmission cables (in particular those where the conductors are insulated using mineral compounds) cannot be used at high temperatures and often fail after a short period of time. Furthermore, some conventional sensors do not have a hermetic seal between the transmission cable and the rest of the sensor assembly. This can allow moisture to penetrate the sensor assembly and reduce the performance of the sensor.

SUMMARY OF THE INVENTION

The present invention provides a sensor for capacitively measuring the distance to a stationary or passing object, comprising an electrically conductive ceramic electrode for capacitively coupling with the object, and a housing that substantially surrounds the electrode.

Because the electrode is formed from an electrically conductive ceramic, the sensor can be used at higher operating temperatures than conventional sensors that use metal or metal-coated ceramic electrodes. The housing is preferably formed from an electrically non-conductive ceramic and may be of any suitable shape or size to suit the installation requirements.

To isolate the electrode from any external electrical interference, the sensor can further comprise a shield that substantially surrounds the electrode and is electrically isolated from the electrode by an insulating layer. The shield is can be formed from a solid piece of electrically conductive ceramic. However, the shield can also be a thin electrically conductive ceramic layer that is deposited onto the insulating layer using conventional deposition techniques. The use of a deposited ceramic layer greatly simplifies both the design of the sensor and subsequent assembly. The shield can also be a thin electrically conductive ceramic or metallic layer that is deposited onto the inside surface of the outer housing conventional deposition techniques. The insulating layer is preferably formed as a machined electrically non-conductive ceramic spacer. The use of a ceramic layer with a similar coefficient of thermal expansion to both the insulating layer and the housing means that the coating will not tend to delaminate in service, which is possible with metallic coatings which have different thermal expansion characteristics.

The electrically conductive ceramic and the non-electrically conductive ceramic are preferably selected to have similar thermal expansion coefficients so that the sensor assembly remains virtually stress free at high operating temperatures. The electrode and the shield can be formed from SiC and the insulating layer and the housing can be formed from SiN, for example. The electrode, shield and housing can be bonded together using standard diffusion bonding or vacuum braising methods to form an integral ceramic structure. The bonding provides a hermetic seal between the components that prevents the ingress of moisture into the sensor assembly and the transmission cable.

The sensor can have a "captive" design so that if any of the ceramic components do fail for any reason then they are retained within the overall sensor assembly.

Instead of joining the conductors of the transmission cable directly to the electrode and the housing at a high temperature region of the sensor, the conductors are preferably connected to electrically conductive bridges that are in turn connected to the electrode and the housing. The electrically conductive bridges extend away from the front face of the electrode (i.e. the face that faces toward the object in use) so that the connection between the conductors and the electrically conductive bridges takes place at a low temperature region at the rear of the sensor.

If the sensor does not include a shield then a coaxial transmission cable having a central conductor and an outer conductor can be used. The central conductor is preferably connected to the electrode by means of a first electrically conductive bridge and the outer conductor is preferably connected to the housing by means of a second electrically conductive bridge. The first electrically conductive bridge preferably passes through apertures provided in the housing and the second electrically conductive bridge.

The connection between the conductors and the electrically conductive bridges is preferably made using an adapter. The adapter can be shaped to accommodate a variety of different types and diameters of transmission cable. Furthermore, the adapter can connect the conductors to the electrically conductive bridges in a number of different orientations depending on the installation requirements of the sensor. For example, the conductors can be connected such that the transmission cable extends away from the front face of the electrode substantially parallel to the electrically conductive bridges. Alternatively, the conductors can be connected such that the transmission cable extends substantially at right angles to the electrically conductive bridges. Other orientations are also possible.

If the sensor does include a shield then a triaxial transmission cable having a central conductor, an intermediate conductor and an outer conductor can be used. The central conductor is preferably connected to the electrode by means of a first electrically conductive bridge, the outer conductor is preferably connected to the housing by means of a second electrically conductive bridge and the intermediate conductor is preferably connected to the shield by means of a third electrically conductive bridge. The first electrically conductive bridge preferably passes through apertures provided in the insulating layer, the shield, the third electrically conductive bridge, the housing and the second electrically conductive bridge. Similarly, the third electrically conductive bridge preferably passes through aperture provided in the housing and the second electrically conductive bridge.

The electrically conductive bridges can be formed from metal or electrically conductive ceramic and are preferably connected to the electrode, housing and shield using standard diffusion bonding or vacuum braising methods. Although it is generally preferred that the bridges are formed from electrically conductive ceramic, metal bridges can be used because they are connected to the electrode, shield and housing at an intermediate temperature region and so do not suffer significantly from the problems of thermal expansion. The electrically conductive bridges can be made in any size or shape depending on the design and installation requirements of the sensor.

An adapter is preferably provided to connect the second and third electrically conductive bridges to the outer and intermediate conductors, as described above.

The second electrically conductive bridge can substantially surround the housing such that it extends a part or all of the way along the side face of the housing. However, it is generally preferred that the shield, the insulating layer, the housing and the second electrically conductive bridge do not extend along the front face of the electrode.

The use of electrically conductive bridges means that the sensor assembly can be manufactured and tested before it is connected to the transmission cable using an adaptor. This is not possible with conventional sensors where the transmission cable has to be directly connected to the electrode, housing and shield during the assembly process.

The electrically conductive bridges can also be used with conventional sensors and those that utilise metal/ceramic and plastics/metal components.

Figure 1:
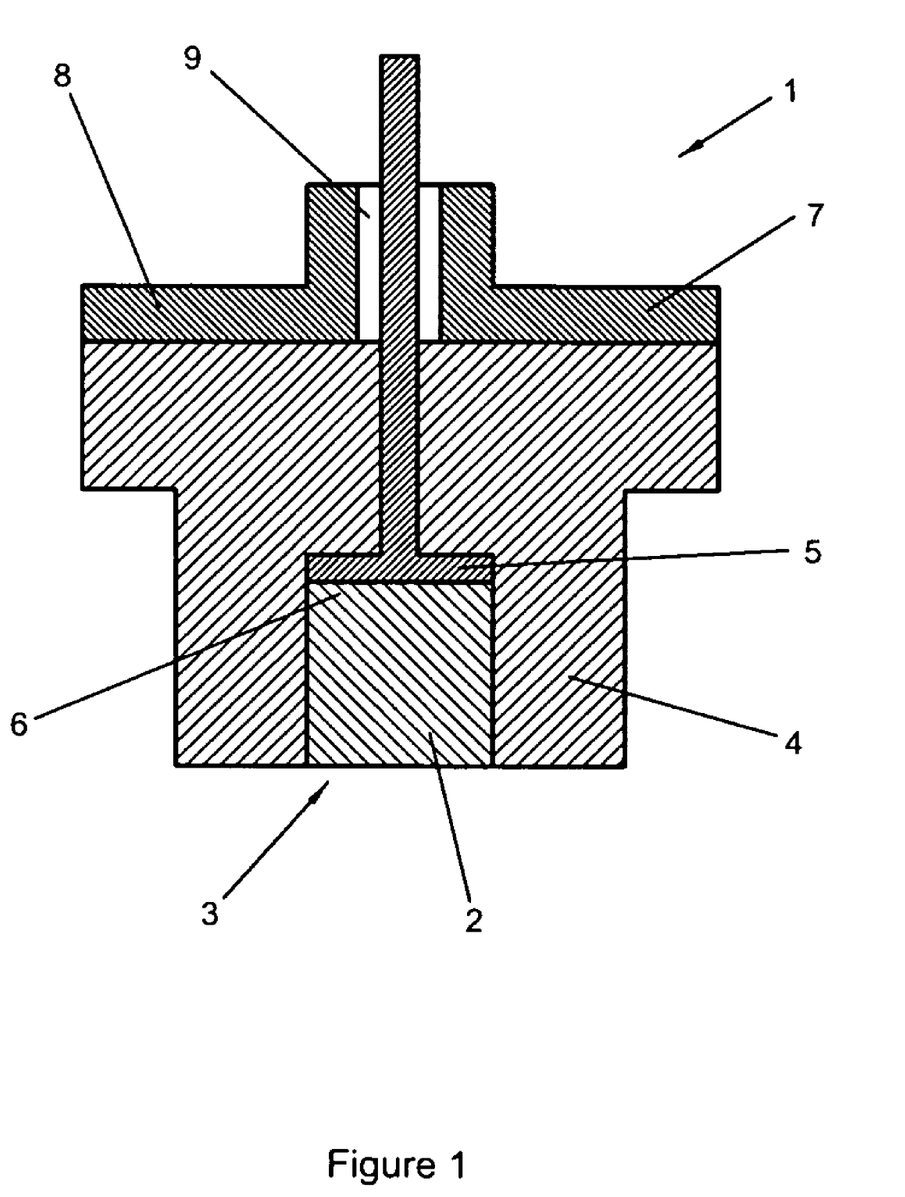
FIG. 1 is a cross-section view of a sensor according to a first embodiment of the present invention.

With reference to FIG. 1, a "coaxial" sensor 1 has a cylindrical electrode 2 formed from an electrically conductive ceramic material. A front face 3 of the electrode 2 is directed toward a stationary or passing object (not shown). The electrode 2 is located within and bonded to a housing 4 formed from an electrically non-conductive ceramic material. The electrically conductive and electrically non-conductive ceramic materials are chosen so that they have a similar thermal expansion coefficient and the sensor 1 remains virtually stress free at high operating temperatures.

A front bridge piece 5 is located within the housing 4 and is bonded to a rear face 6 of the electrode 2. A rear bridge piece 7 is bonded to a rear face 8 of the housing 4. The front bridge piece 5 passes through apertures provided in the housing 4 and the rear bridge piece 7 to extend beyond the rear bridge piece. The aperture provided in the rear bridge piece 7 is wider than the front bridge piece 5 so that the two bridge pieces are separated by an annular air gap 9.

Figure 2:
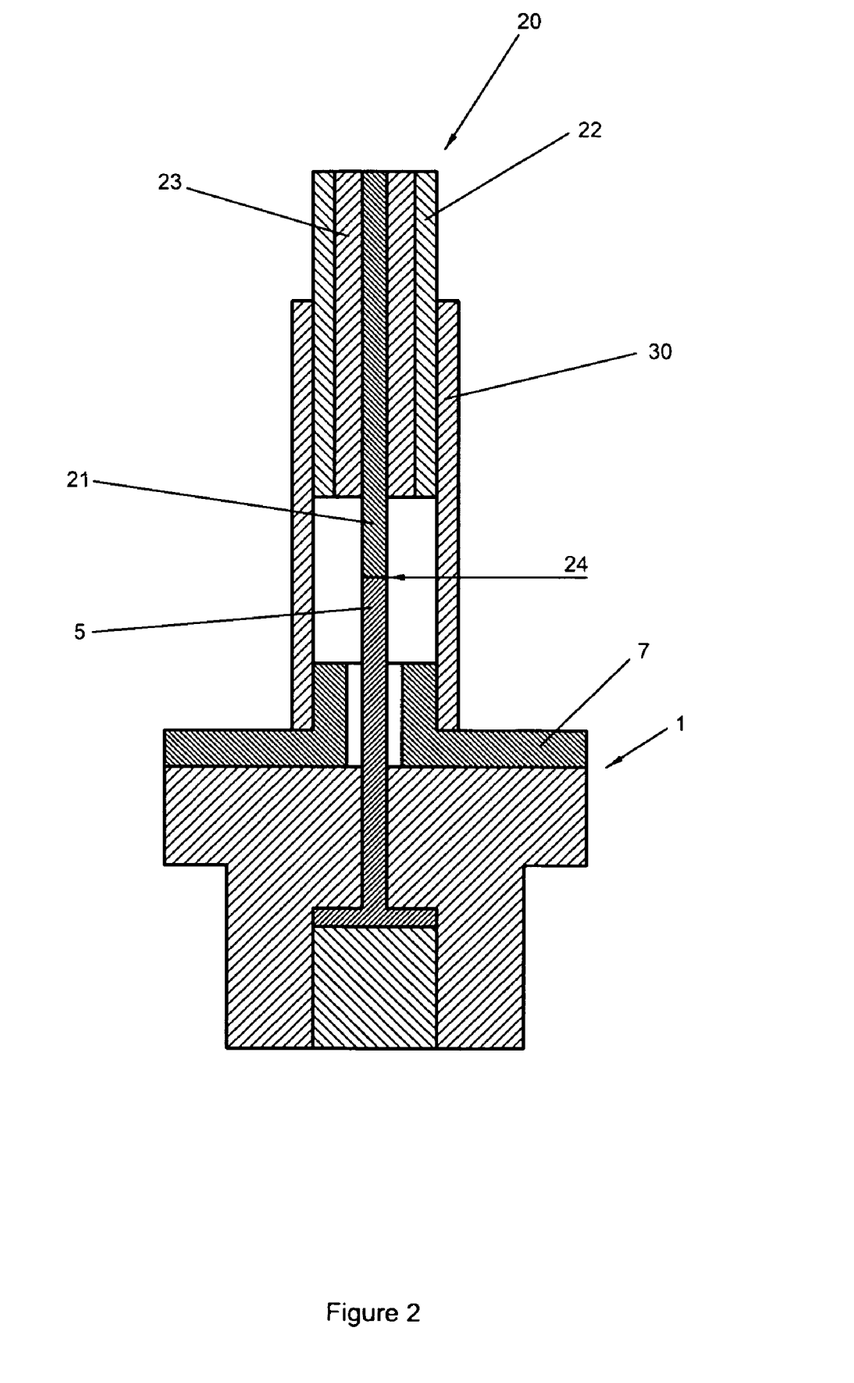
FIG. 2 is a cross-section view showing how the sensor of FIG. 1 can be connected to a coaxial transmission cable in a first orientation.

The front and rear bridge pieces 5 and 7 are connected to the two concentric conductors of a mineral insulated coaxial transmission cable 20 as shown in FIG. 2. The transmission cable 20 has a central conductor 21 and an outer conductor 22 separated by a mineral insulating layer 23. An electrically conductive cylindrical adaptor 30 is used to join the front bridge piece 5 to the central conductor 21 at a common interface 24 and the rear bridge piece 7 to the outer conductor 22. Alternatively, the electrically conductive adaptor 40 shown in FIG. 3 can be used. The adaptor 40 is designed to receive the transmission cable 20 such that central and outer conductors 21 and 22 are connected substantially at right angles to the front and rear bridge pieces 5 and 7 and the centreline of the sensor 1.

Figure 3:
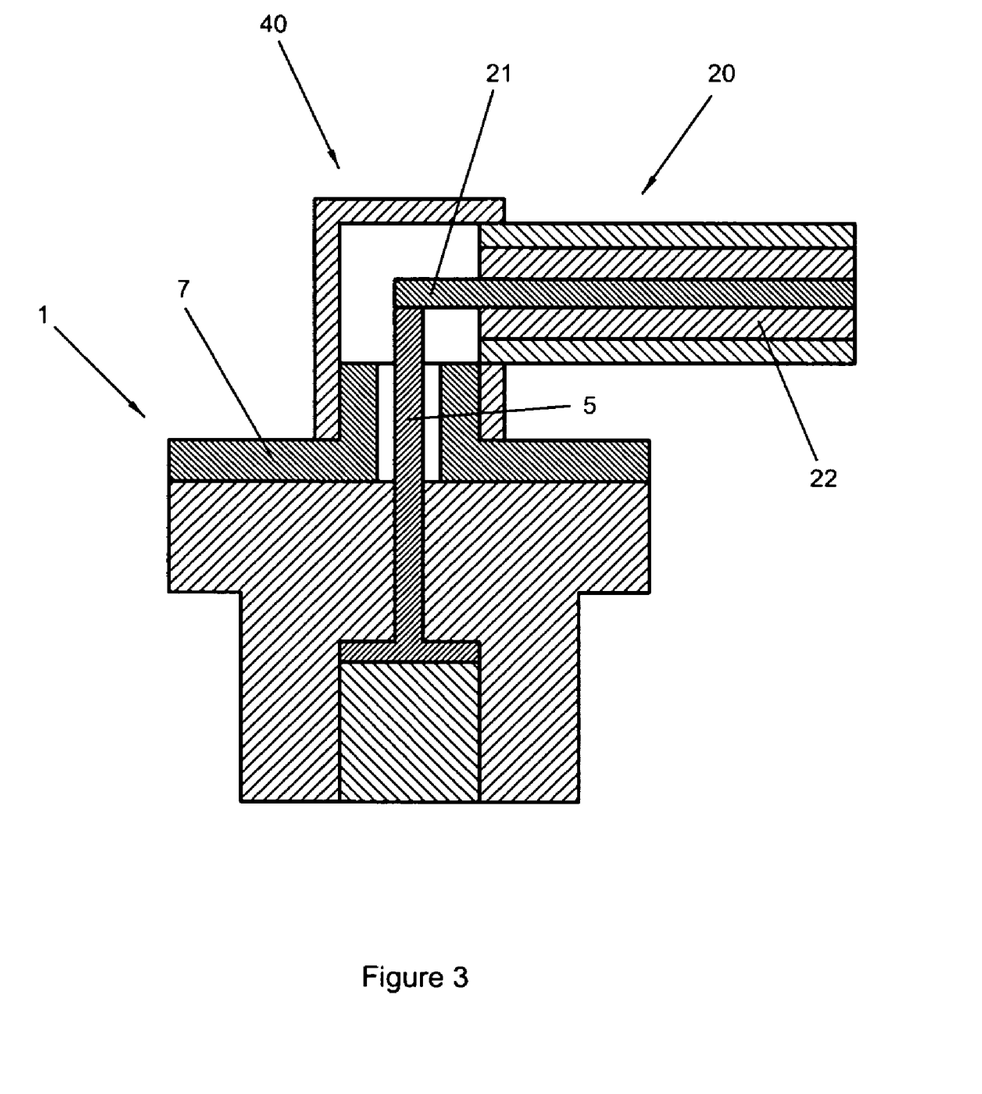
FIG. 3 is a cross-section view showing how the sensor of FIG. 1 can be connected to a coaxial transmission cable in a second orientation.

It will be readily appreciated that the use of the adaptor 30, 40 means that the "coaxial" sensor 1 can be fully assembled and tested before being connected to the transmission cable 20. It also means that the front and rear bridges pieces 5 and 7 and the central and outer conductors 21 and 22 are connected together at a low-temperature region or the sensor 1.

Figure 4A:
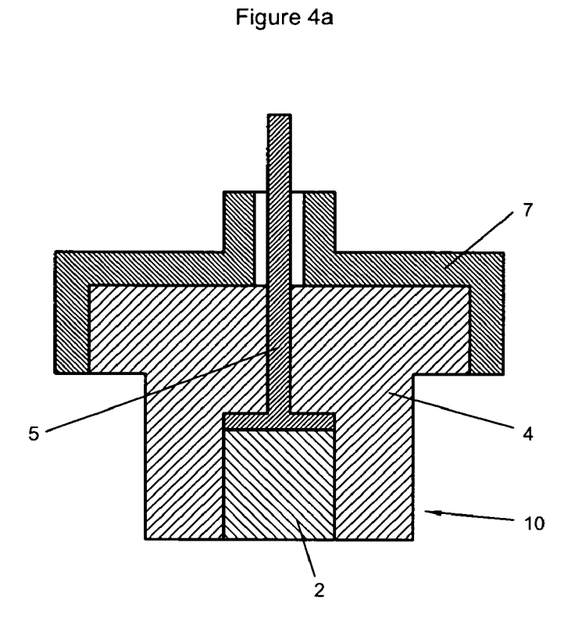
FIGS. 4a and 4b are cross-section views showing how the first electrically conductive bridge can be adapted to substantially surround the housing of the sensor of FIG. 1.
Figure 4B:
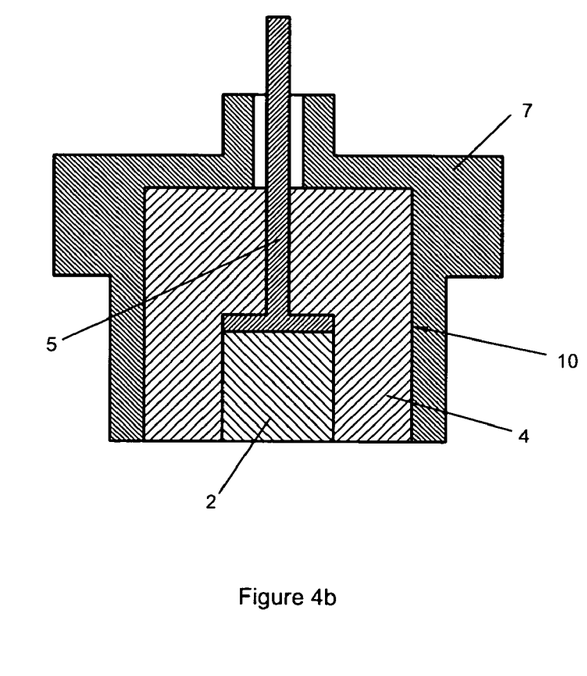

In FIGS. 1 to 3, the rear bridge piece 7 is formed on the rear face 8 of the housing 4 only. However, the rear bridge piece 7 can also extend along part or all of the side face 10 of the housing 4 as shown in FIGS. 4a and 4b.

In operation, the "coaxial" sensor 1 is mounted so that the front face 3 of the electrode 2 is directed toward the stationary or passing object. The electrode 2 is energised by a signal transmitted along the central conductor 21 of the transmission cable 20 so that it capacitively couples with the stationary or passing object. The changes in the capacitance detected by the electrode 2 are transmitted back along the central conductor 21 as voltage signals and converted into distance measurements so that the distance between the electrode and the stationary or passing object can be calculated.

Figure 5:
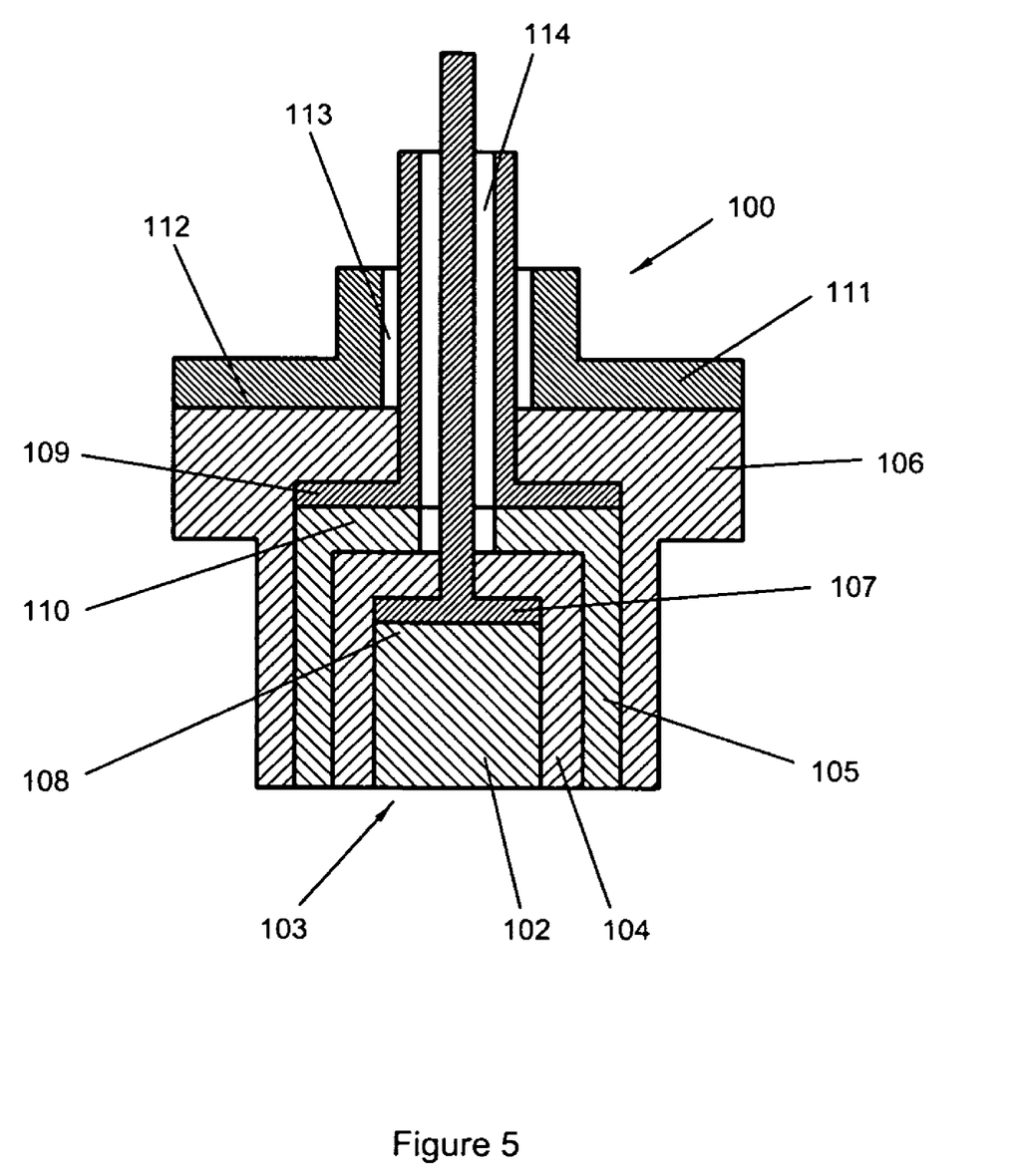
FIG. 5 is a cross-section view of a sensor according to a second embodiment of the present invention.

With reference to FIG. 5, a "triaxial" sensor 100 has a cylindrical electrode 102 formed from an electrically conductive ceramic material. A front face 103 of the electrode 102 is directed toward a stationary or passing object (not shown). The electrode 102 is located within and bonded to an electrically non-conductive ceramic spacer 104. The electrode 102 and the spacer 104 are located within and bonded to an electrically conductive ceramic shield 105 which isolates the electrode from any external electrical interference. The shield 105 is located within and bonded to a housing 106 formed from an electrically non-conductive ceramic material. The electrically conductive and electrically non-conductive ceramic materials are chosen so that they have a similar thermal expansion coefficient.

A front bridge piece 107 is bonded to a rear face 108 of the electrode 102. An intermediate bridge piece 109 is bonded to a rear face 110 of the shield 105. A rear bridge piece 111 is bonded to a rear face 112 of the housing 106. The intermediate bridge piece 109 passes through apertures provided in the housing 106 and the rear bridge piece 111 to extend beyond the rear bridge piece. The front bridge piece 107 passes through apertures provided in the spacer 104, the shield 105, the intermediate bridge piece 109 and the rear bridge piece 111 to extend beyond the intermediate bridge piece and the rear bridge piece. The aperture provided in the rear bridge piece 111 is wider than the intermediate bridge piece 109 so that the two bridge pieces are separated by an annular air gap 113. Similarly, the aperture provided in the intermediate bridge piece 109 is wider than the front bridge piece 107 so that the two bridge pieces are separated by an annular air gap 114.

Figure 5A:
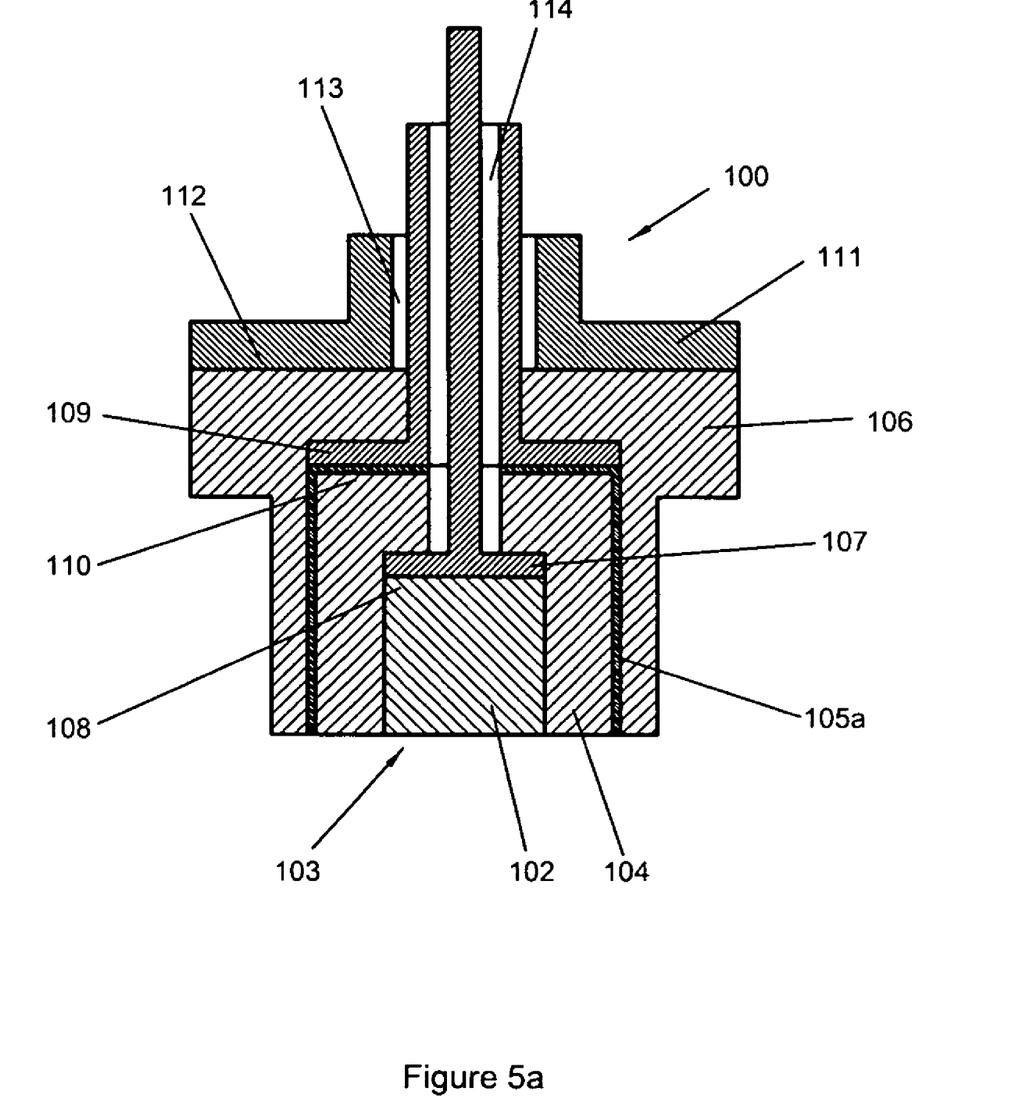
FIG. 5a is a cross-section view of a sensor according to a third embodiment of the present invention.

With reference to FIG. 5a, the electrically conductive ceramic shield 105 shown in FIG. 5 can be replaced by a thin electrically conductive ceramic layer 105a that is deposited onto the spacer 104 using conventional techniques. The ceramic layer 105a contacts the intermediate bridge piece and functions in exactly the same way as the shield 105. The use of a thin deposited ceramic layer 105a allows the size of the spacer 104 to be increased with an improvement in the strength and robustness of the sensor. The resulting sensor is also easier to assemble because to the simplification in the overall sensor design.

Figure 5B:
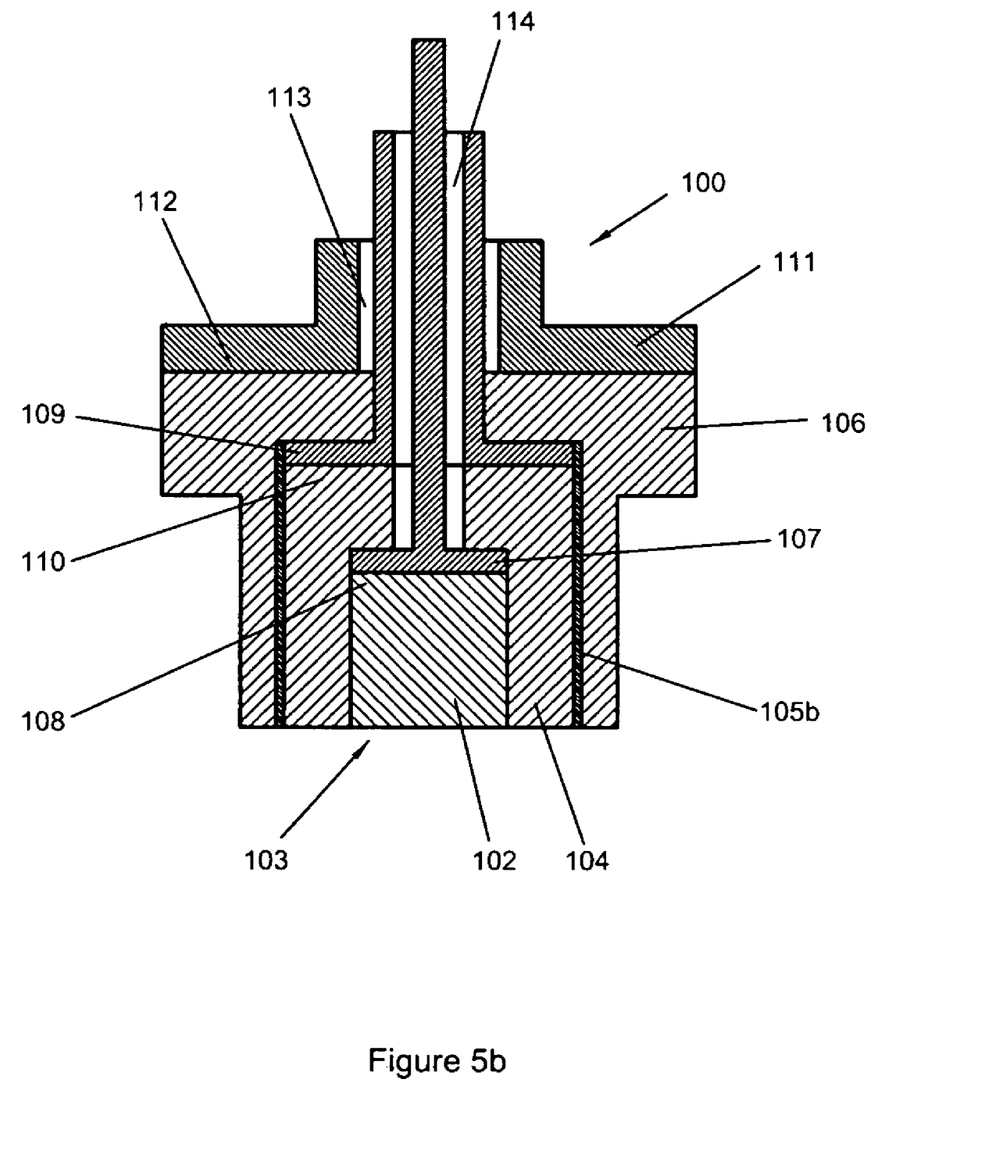
FIG. 5b is a cross-section view of a sensor according to a fourth embodiment of the present invention.

With reference to FIG. 5b, the electrically conductive ceramic shield 105 shown in FIG. 5 can be replaced by a thin electrically conductive ceramic or metallic layer 105b that is deposited onto the inside surface of the electrically non-conductive outer housing 106 using conventional deposition techniques. The conductive layer 105b contacts the intermediate bridge piece and functions in exactly the same way as the shield 105. The use of a thin deposited conductive layer 105b allows the size of the spacer to be increased with an improvement in the performance of the sensor. The sensor is also easier to assemble because of the simplification in the overall sensor design.

Figure 6:
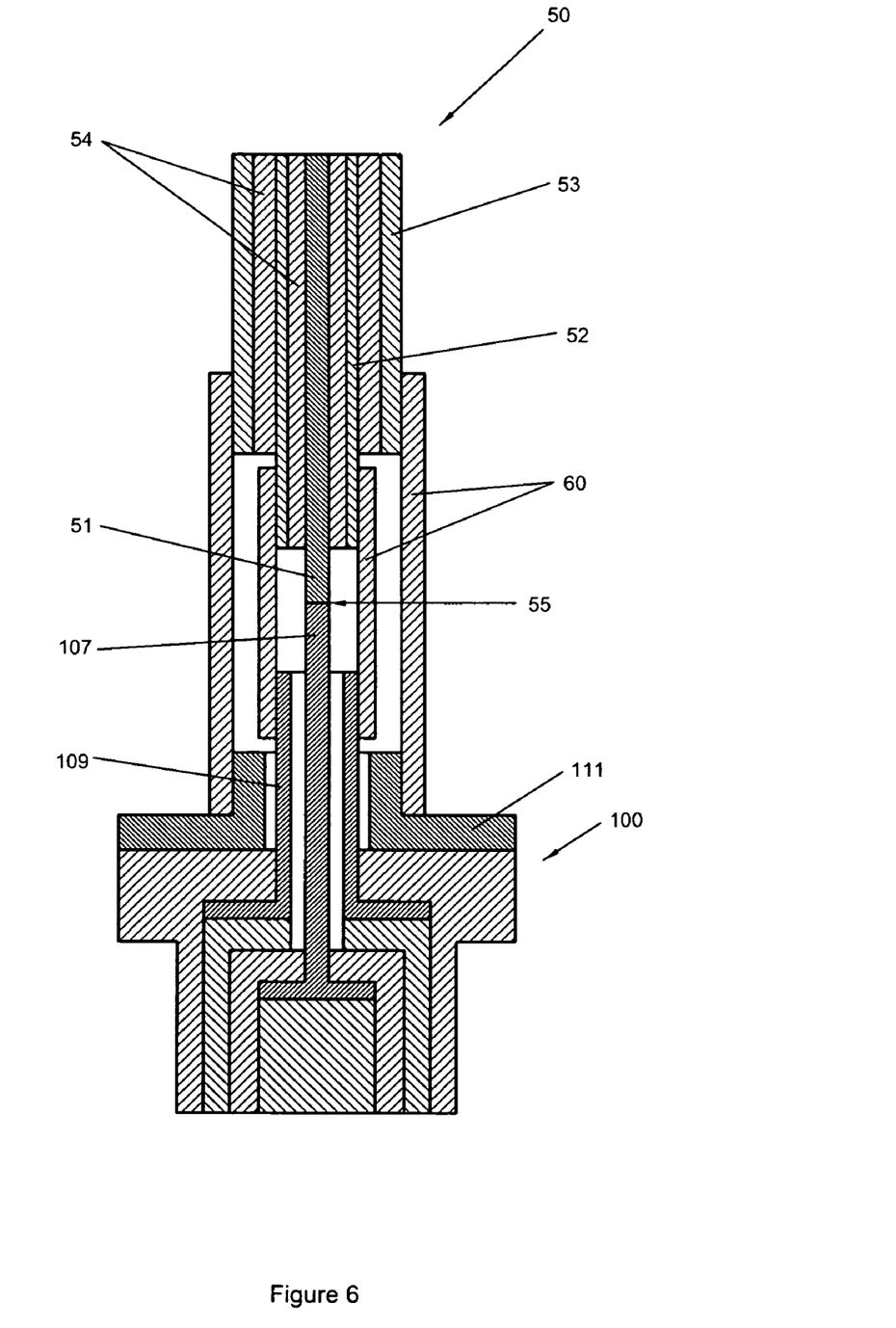
FIG. 6 is a cross-section view showing how the sensor of FIG. 5 can be connected to a triaxial transmission cable in a first orientation.
Figure 7:
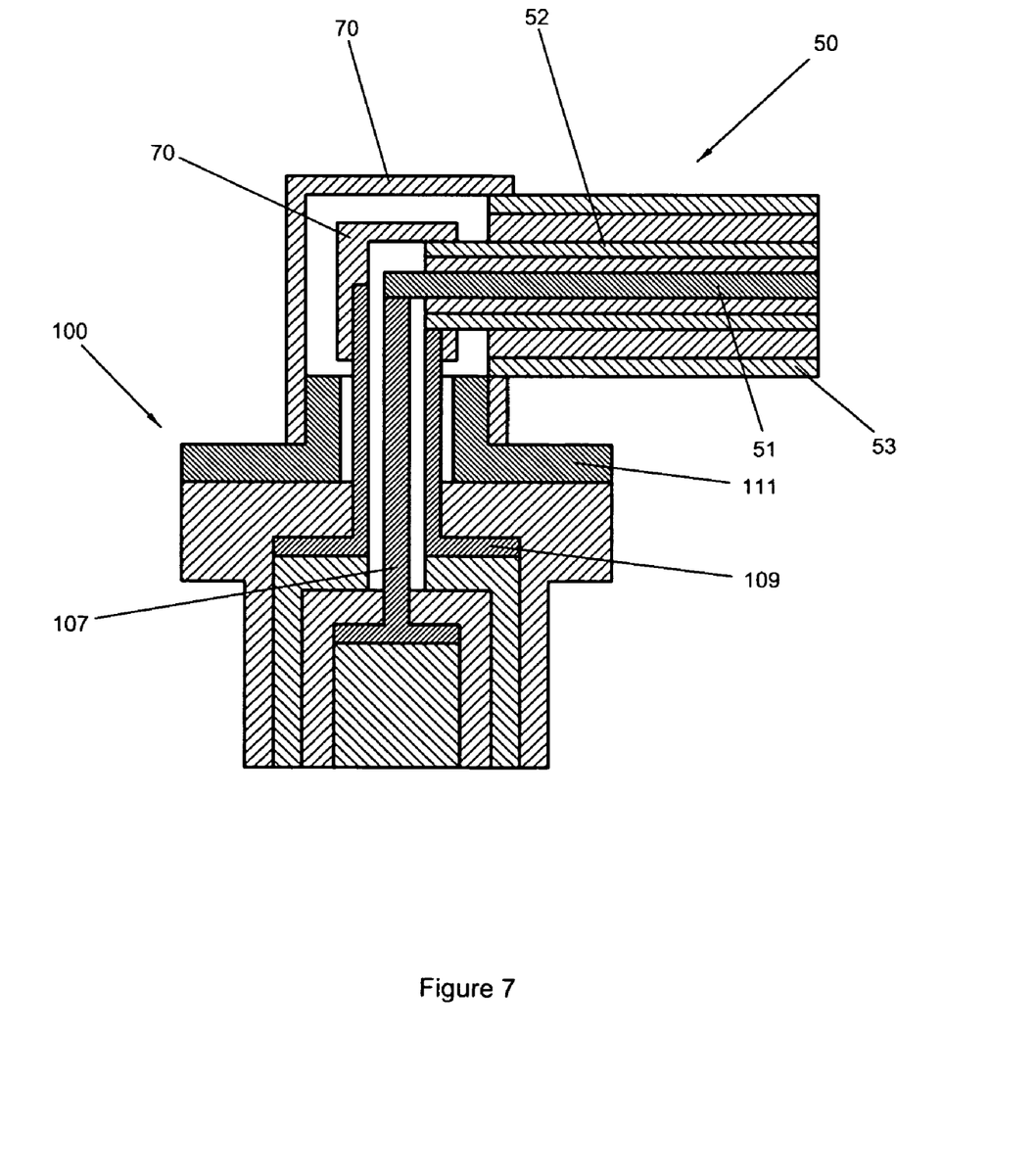
FIG. 7 is a cross-section view showing how the sensor of FIG. 5 can be connected to a triaxial transmission cable in a second orientation.

The front, intermediate and rear bridge pieces 107, 109 and 111 are connected to the three concentric conductors of a mineral insulated triaxial transmission cable 50 as shown in FIG. 6. The transmission cable 50 has a central conductor 51, an intermediate conductor 52 and an outer conductor 53 separated by mineral insulating layers 54. An electrically conductive cylindrical adaptor 60 is used to join the front bridge piece 107 to the central conductor 51 at a common interface 55, the intermediate bridge piece 109 to the intermediate conductor 52 and the rear bridge piece 111 to the outer conductor 53. Alternatively, the electrically conductive adaptor 70 shown in FIG. 7 can be used. The adaptor 70 is designed to receive the transmission cable 50 such that the central, intermediate and outer conductors 51, 52 and 53 are connected substantially at right angles to the front, intermediate and rear bridge pieces 107, 109 and 111 and the centreline of the sensor 100.

The "triaxial" sensor 100 has the same technical advantages and may operate in the same way as the "coaxial" sensor 1 described above. It will be readily appreciated that different measurement electronics can be used with the "coaxial" and "triaxial" sensors.

The invention claimed is:

1. A sensor for capacitively measuring the distance to a stationary or passing object comprising:
   a sensor assembly having an electrode for capacitively coupling with the object, a shield that surrounds the electrode and is electrically isolated from the electrode by an insulating layer, and a housing that substantially surrounds the electrode and the shield;
   a first electrically conductive bridge connected to the electrode and connectable to a first conductor of a transmission cable;
   a second electrically conductive bridge connected to the shield and connectable to a second conductor of the transmission cable; and
   a third electrically conductive bridge connected to the housing and connectable to a third conductor of the transmission cable;
   wherein the electrode and the shield are formed entirely from an electrically conductive ceramic material and the insulating layer and the housing are formed entirely from an electrically non-conductive ceramic material such that the sensor assembly is formed entirely from ceramic materials, and in that the electrically conductive and electrically non-conductive ceramic materials are selected to have substantially similar thermal expansion coefficients, such that the sensor assembly remains virtually stress free at high operating temperatures.

2. A sensor according to claim 1, wherein the shield is formed from a solid piece of electrically conductive ceramic.

3. A sensor according to claim 1, wherein the shield is a deposited electrically conductive ceramic layer.

4. A sensor according to claim 3, wherein the shield is deposited onto the inside surface of the housing.

5. A sensor according to claim 4, wherein the first electrically conductive bridge passes through apertures provided in the housing and the second electrically conductive bridge.

6. A sensor according to claim 5, wherein the second electrically conductive bridge substantially surrounds the housing.

7. A sensor according to claim 4, wherein the second electrically conductive bridge substantially surrounds the housing.

8. A sensor according to claim 4, further comprising an adaptor for connecting the second electrically conductive bridge to the conductor of a transmission cable.

9. A sensor according to claim 4, wherein the first electrically conductive bridge passes through apertures provided in the insulating layer, the shield, the third electrically conductive bridge, the housing and the second electrically conductive bridge, and wherein the third electrically conductive bridge passes through apertures provided in the housing and the second electrically conductive bridge.

10. A sensor according to claim 9, further comprising an adaptor for connecting the second electrically conductive bridge to the conductor of a transmission cable and the third electrically conductive bridge to the conductor of a transmission cable.

11. A sensor according to claim 4, further comprising an adaptor for connecting the second electrically conductive bridge to the conductor of a transmission cable and the third electrically conductive bridge to the conductor of a transmission cable.

12. A sensor according to claim 1, wherein one or more of the electrode, shield, insulating layer and housing are bonded together.

13. A sensor according to claim 12, wherein the bonding provides a hermetic seal between the one or more of the electrode, shield, insulating layer and housing.

* * * * *